United States Patent [19]

Bensadoun

[11] Patent Number: 4,670,735

[45] Date of Patent: Jun. 2, 1987

[54] LIQUID RHEOSTAT WITH CIRCULATING ELECTROLYTE

[76] Inventor: Michel Bensadoun, Le Montin, 87270 Couzeix, France

[21] Appl. No.: 751,055

[22] Filed: Jul. 2, 1985

[30] Foreign Application Priority Data

Jul. 10, 1984 [FR] France .................................. 84 10944

[51] Int. Cl.⁴ ............................................ H01C 10/02
[52] U.S. Cl. ........................................ 338/81; 338/86; 417/36; 417/38
[58] Field of Search .................. 338/86, 80, 82, 56, 338/81, 83, 84, 85; 307/117, 118; 417/36, 38, 45, 37

[56] References Cited

U.S. PATENT DOCUMENTS

| | | | |
|---|---|---|---|
| 1,409,670 | 3/1922 | Chubb | 338/86 |
| 2,602,125 | 7/1952 | Crawford et al. | 338/86 |
| 2,632,077 | 3/1953 | Halter | 338/86 |
| 3,430,017 | 2/1969 | Storsand | 338/81 X |
| 3,609,626 | 9/1971 | Beyrard | 338/81 X |
| 3,935,554 | 1/1976 | Rabus | 338/82 |
| 4,039,854 | 8/1977 | Elliott, Jr. et al. | 338/56 X |
| 4,232,998 | 11/1980 | Osgood | 417/36 |
| 4,325,049 | 4/1982 | Bensadoun | 338/86 |

FOREIGN PATENT DOCUMENTS

| | | |
|---|---|---|
| 816436 | 10/1951 | Fed. Rep. of Germany . |
| 1549390 | 12/1968 | France . |
| 2395578 | 1/1979 | France . |
| 2436484 | 4/1980 | France . |
| 2532101 | 2/1984 | France . |
| 2030783 | 4/1980 | United Kingdom . |

Primary Examiner—Joseph W. Hartary
Assistant Examiner—M. M. Lateef
Attorney, Agent, or Firm—Charles E. Brown; Charles A. Brown

[57] ABSTRACT

A rheostat of the kind that comprises a tank containing electrolyte and at least two electrodes, one electrode being connectable to an electric power supply and the other electrode being connectable to apparatus to be fed by the power supply. The electrodes define therebetween an electrolyte flow path and there is associated with the electrolyte flow path operational pumping apparatus providing for a controlled effective circulation of the electrolyte between the electrodes. The rheostat is particularly usable in conjunction with the starting of squirrel-cage motors.

26 Claims, 18 Drawing Figures

LIQUID RHEOSTAT WITH CIRCULATING ELECTROLYTE

The present invention is generally concerned with liquid resistance rheostats, usually referred to in abbreviated form as liquid rheostats, of the type used for controlling the supply of electrical power to any form of apparatus from an electrical power supply, more precisely for the controlled starting of any form of electric motor.

As is known a liquid resistance rheostat of this kind comprises a tank which contains electrolyte, or more generally speaking any form of conductive liquid, and at least two spaced electrodes designed to cooperate with said electrolyte.

With regard to the method of connecting their electrodes, liquid resistance rheostats known at present may generally be divided into one or the other of two broad categories.

Firstly there are those in which the electrodes in the electrolyte tank are all of the same kind, being in practice all connected to the apparatus to be controlled.

In the case of a motor, there is then in the electrolyte tank one electrode per phase or pole of the motor.

The current output is then controlled by the depth to which the electrodes are immersed in the electrolyte, this depth of immersion being altered between two predetermined levels.

For the lower level only a relatively minor part of the electrodes is immersed, the result of which is that the electrodes introduce a relatively high resistance into the circuit into which they are inserted; on the other hand, for the higher level, the electrodes are virtually totally immersed and introduce a virtually negligible resistance into the circuit.

In other words, in these variable level liquid resistance rheostats, the variation in resistance is due primarily to the electrodes, according to the degree to which they are immersed, rather than to the electrolyte.

Variable level liquid resistance rheostats of this kind are described in particular in French patent application No. 78 26267 filed Sept. 13, 1978 and published under the number 2 436 484, and in French patent application No. 82 14174 filed Aug. 23, 1982 and published under the number 2 532 101.

They have given and may continue to give satisfaction.

The have disadvantages, however, as follows.

In reality, in the case of starting electric motors, these variable level liquid resistance rheostats are only well suited to slip-ring motors, that is to say "rotor start" motors, the resistance of their electrodes being connected in series with the resistance of the rotor windings of the motor; on starting the motors, they provide relatively easy control over the torque, by automatically adjusting to the torque.

On the other hand, variable level liquid resistance rheostats are ill suited to squirrel-cage motors, that is to say "stator start" motors.

These motors offer the advantage of being able to start at two voltages, according to the star or delta connection of the winding of the stator, and these windings, which are in thin wire, are relatively economical.

When the delta arrangement is used, which is a situation that must be systematically provided for, it is difficult to associate with them a variable level liquid resistance rheostat for starting them.

If a single electrolyte tank is used, it inevitably results in a short-circuit between the different phases involved, although if a separate electrolyte tank is used for each phase, in order to avoid any such short-circuit, which is expensive, there arise relatively complex problems of insulating these tanks from one another and of cooling the electrolyte contained in each tank, problems which are virtually impossible to overcome.

The second broad category of liquid resistance rheostats is that of rheostats in which the electrodes in the electrolyte tank are of different kinds, one or at least one of the electrodes being then designed to be connected to the electrical power supply whereas the other or at least one other electrode is designed to be connected to the apparatus fed by the supply.

In practice, in these rheostats the electrolyte level remains constant and the output current is controlled by virtue of the decrease in the resistance of the electrolyte when its temperature rises.

Initially this temperature is relatively low, being the same as the ambient temperature, for example, and the resistance between the electrodes is therefore relatively high; as the temperature progressively rises, the resistance between the electrodes progressively decreases.

Thus in constant level liquid resistance rheostats of this type the variation in resistance is due entirely to the electrolyte, unlike variable level liquid resistance rheostats in which it is essentially due to the electrodes.

A constant level liquid resistance rheostat of this kind is described in particular in French Pat. No. 1 549 390 of Oct. 6, 1976.

Although capable of giving satisfaction, at least in certain applications, it features the following disadvantages.

First of all, and as previously, to avoid any possibility of a short-circuit it is necessary to provide one electrolyte tank per phase, with the above indicated disadvantages of complexity and insulation and cooling problems.

Also, and above all else, after a number of successive starts the electrolyte temperature progressively and systematically rises, one result of which is that the start cycles are not executed under identical conditions, since they are carried out at different temperatures, while another result is that, if such successive starts are very closely spaced, there is the risk of a final start at maximum current, without any further current limiting, which is the opposite of what is required and which may give rise to hazardous situtations for the installation concerned as a whole.

A general object of the present invention is a liquid resistance rheostat free of the disadvantages briefly outlined above and further procuring additional advantages.

More precisely, its object is a liquid resistance rheostat of the kind comprising a tank containing electrolyte and at least two spaced electrodes of which one is adapted to be connected to an electrical power supply and the other to the apparatus to be fed by said electrical power supply, the liquid resistance rheostat being characterized in that said electrodes define between them an electrolyte circulation space and in that there are associated with them pulsing means adapted to procure an effective controlled circulation of electrolyte between them.

Thus in accordance with the invention, and as distinguished from liquid resistance rheostats known at present, in which the electrolyte level between the electrodes varies only between two relatively closely spaced values, for variable level liquid resistance rheostats, or is fixed at a constant value, for constant level liquid resistance rheostats, there is effected systematic circulation of electrolyte between the electrodes.

Numerous advantages result from this.

First of all, and in a manner which is a priori surprising, it is advantageously possible to make do with a single electrolyte tank for all the phases involved, without producing any short-circuit between them, although this means that the same conductive liquid is associated with all phases.

The reason may possibly reside in the fact that the electrical path from one phase to another remains long.

Be this as it may, the circulating electrolyte liquid resistance rheostat in accordance with the invention may equally well be used, without any complications and within minimal overall dimensions, for starting squirrel-cage ("stator start") motors and slip-ring ("rotor start") motors.

By virtue of the fact that it is being circulated, the electrolyte used is in practice subject to only a moderate temperature rise on each start, so that it is possible to execute in a reliably repetitive manner a large number of successive starts without this producing any significant drift in the starting conditions achieved.

However, if necessary the electrolyte may be systematically cooled without introducing any significant complication.

It is sufficient to exploit the pulsing means employed to circulate the electrolyte, by feeding the electrolyte into a heat exchanger on leaving said pulsing means to cool it, for example.

Also, circulation of the electrolyte in accordance with the invention makes it possible to achieve relatively high current densities.

The reason for this is that, instead of stagnating, the gas microbubbles which appear at the surface of the electrodes and which, being insulative, retard the passage of current, are mechanically entrained by the electrolyte as and when they are formed, which systematically regenerates on a continuous basis the natural capacity for interchange between the electrolyte and said electrodes.

All that is needed is for the electrolyte circulation rate to be sufficiently high, although there is no critical speed in this respect.

By way of illustration, it is possible without significant complication to achieve by means of a circulating electrolyte liquid rheostat in accordance with the invention current densities higher than several amperes per square centimeter whereas in constant level liquid resistance rheostats, for example, each electrode operates with a current density of the order of one-tenth of an ampere per square centimeter.

In practice the total current capability is inversely proportional to the distance between the electrodes, which may be made very small, and directly proportional to the wetted surface area of the electrodes and to the conductivity of the electrolyte between them.

In accordance with one feature of the invention the circulation space formed between the electrodes of the same phase advantageously of itself constitutes chicane means for the electrolyte which, by imposing a zig-zag flowpath on the electrolyte, produces relatively large exchange surface areas within a relatively small volume.

It results from what has been said above that the circulating electrolyte liquid resistance rheostat in accordance with the invention may advantageously be implemented in a relatively compact form and/or that it may with advantage be possible to make do with a liquid which is a relatively poor conductor, even ordinary water.

For the purpose of controling the current between electrodes of the same phase, it is naturally possible to operate on the throughput of the pulsing means employed to circulate the electrolyte.

However, in accordance with one feature of the invention, it is also and advantageously possible to operate on an opposed throughput.

According to this feature of the invention, the circulation space formed between the two electrodes of the same phase advantageously of itself constitutes a retention volume for the electrolyte and with said retention volume there are associated evacuation means adapted to empty it in a controlled manner.

For controling the current between the electrodes, it is therefore sufficient, if required, to adjust appropriately these evacuation means, possibly concurrently with the throughput of the associated pulsing means.

The retention volume that the electrodes for each phase thus form offers further advantages.

By retaining a large quantity of electrolyte between the electrodes, it firstly and advantageously makes it possible to eliminate any current surge when, in the usual manner, after the required start, a moving contact makes an electrical connection between the electrodes, to take them out of service and thus avoid an unnecessary increase in the electrolyte temperature.

It further provides for alleviating the consequences of any short-term break in the power supply to the control means for this contact, as it then takes over from the latter.

Finally, and above all, it provides for progressively stopping the apparatus controlled by it, if required, by progressively emptying it.

Thus, and according to a particularly advantageous feature of the invention, it is possible with the circulating electrolyte liquid resistance rheostat in accordance with the invention, which is not the case with liquid resistance rheostats of other kinds known at this time, to provide for not only a controlled increase in speed, or acceleration, of a motor, but also, and if desired, deceleration thereof.

This possibility may find an application, for example, in progressively shutting down a pump, which can avoid the unwanted occurrence of water hammer, and/or in progressively shutting down a compressor, which makes it possible to avoid any inrush of current such as usually causes wear and various other disturbances on such shutdown.

Finally, in accordance with another characteristic, the electrodes of the circulating electrolyte liquid resistance rheostat in accordance with the invention may with advantage be spaced from the electrolyte before they come into operation.

The originality of this feature will be clear if it is remembered that, in liquid resistance rheostats known at this time, the electrodes are preferably at least partially immersed in the standby position.

This is the case, of course, with constant level liquid resistance rheostats, in which the electrodes are totally immersed in the electrolyte at all times.

However, it is also the case with variable level liquid resistance rheostats, to avoid any unwanted inrush of current on starting, when contact is established between the electrolyte and the electrodes.

No comparable inrush of current is observed on starting with the circulating electrolyte liquid resistance rheostat in accordance with the invention.

Thus the electrodes thereof may be initially spaced from the electrolyte.

A result of this is that, by providing galvanic isolation, the circulating electrolyte liquid resistance rheostat in accordance with the invention advantageously makes it possible to eliminate a line contactor between it and the electrical power supply employed.

This advantage is all the more significant in that in practice line contactors are usually relatively costly and their price represents a non-negligible proportion of the overall cost of an installation.

The characteristics and advantages of the invention will moreover emerge from the following description given by way of example with reference to the accompanying schematic drawings, in which.

Figure 1:
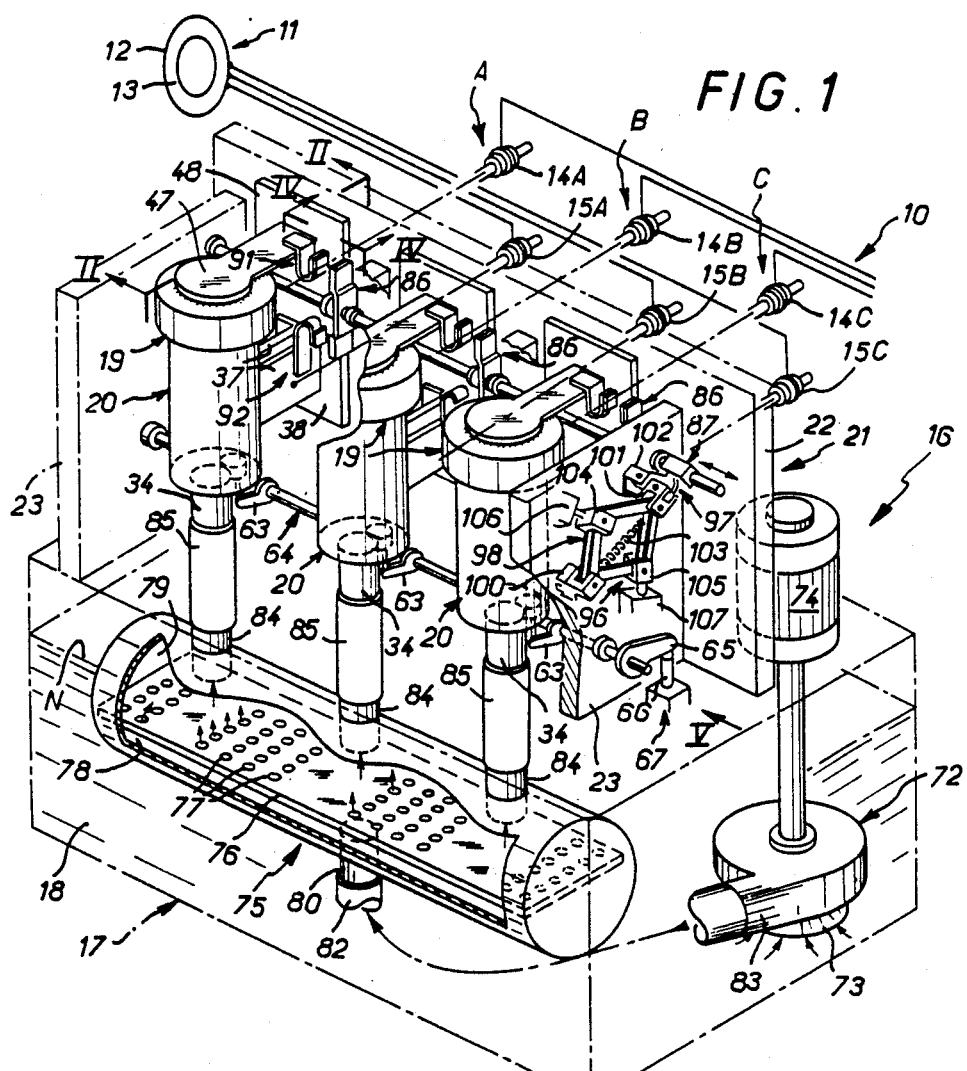
FIG. 1 is a partially cut away view in perspective of a liquid resistance rheostat in accordance with the invention, with its frame and jacket for the most part not shown.

As shown by FIG. 1, the overall intention is to connect an electrical power supply 10, in practice the mains supply, to a motor 11 of which the stator 12 and the rotor 13 are schematically represented, more specifically to start a motor 11 of this kind.

The motor 11 is a squirrel-cage motor, for example, and thus a "stator start" motor.

Be this as it may, there are three phases or poles A, B and C to be taken into consideration.

Between the power supply 10 and the motor 11 there is inserted a liquid resistance rheostat 16 with terminals 14A, 14B and 14C for connecting it to said power supply 10 and terminals 15A, 15B and 15C for connecting it to said motor 11.

In the manner known per se, this liquid resistance rheostat 16 comprises a tank 17 which contains electrolyte 18 and of which only the contour is schematically represented in chain-dotted line in FIG. 1, with the level N of the electrolyte that it contains indicated, and for each phase A, B and C two electrodes 19 and 20 spaced from one another and of which one is connected to one of terminals 14A, 14B and 14C and the other to the corresponding terminal 15A, 15B and 15C, and which are thus adapted to be connected, the first to the power supply 10 and the second to the motor 11.

In accordance with the invention these electrodes 19 and 20 are disposed above the electrolyte tank 17, initially without contact with electrolyte 18 contained in it.

For example, they are carried by a superstructure 21 which forms a framework and is itself supported by the tank 17.

As the construction of this superstructure 21 is within the competence of those skilled in the art and does not of itself constitute part of the present invention, it will not be described in detail here.

It will suffice to indicate that this superstructure 21, which is shown only partially and schematically in chain-dotted line in the figures, may for example comprise an array of longitudinal partitions 22 and transverse partitions 23.

In accordance with the invention the two electrodes 19 and 20 for each phase A, B and C define between them a space 24 for circulation of the electrolyte 18 and, as will be described in more detail subsequently, there are associated with them pulsing means adapted to procure an effective controlled circulation of electrolyte between them.

In practice, the electrodes 19 and 20 are identical for each of the phases A, B and C.

Therefore only the electrodes 19 and 20 for the phase A will be described here with reference to FIGS. 2 and 3.

In the embodiment shown, both the electrodes 19 and 20 are generally annular and they are disposed substantially coaxially relative to one another.

One of these electrodes, in this instance the electrode 20, hereinafter referred to for convenience as the inlet electrode, comprises a central tubular member 25 which is open at both ends and through which the flow of electrolyte 18 enters, whereas the other electrode 19, hereinafter referred to for convenience as the outlet electrode, comprises at least one blind tubular member 27 which is engaged with clearance over the central tubular member 25 of the inlet electrode 20.

In practice, the electrodes 19 and 20 being disposed vertically, the blind tubular member 27 of the outlet electrode 19 has its bottom 28 at the upper end 29 of the central tubular member 25 of the inlet electrode 20.

In the embodiment shown, the outlet electrode 19 comprises in succession two blind tubular ring members, namely the aforementioned blind tubular member 27 and a blind tubular member 30 which is disposed annularly around the latter and which shares its bottom 28 while, alternating with these blind tubular members 27 and 30, the inlet electrode 20 itself comprises, around its central tubular member 25, a blind tubular member 31.

The bottom 32 of the blind tubular member 31 which the inlet electrode 20 thus comprises features an axial passage 33 through which the central tubular member 25 that it surrounds passes through it, being fastened to it, as by welding, for example.

The central tubular member 25 projects above the bottom 32 of the blind tubular member 21, and thus in the upwards direction.

Only the lower end 34 projects downwards, forming a connecting tube for the assembly, as will emerge hereinafter.

In the embodiment shown the cylindrical side wall 36 of the blind tubular member 31 of the inlet electrode 20 extends to substantially the same level as the central tubular member 25 thereof.

Figure 2:
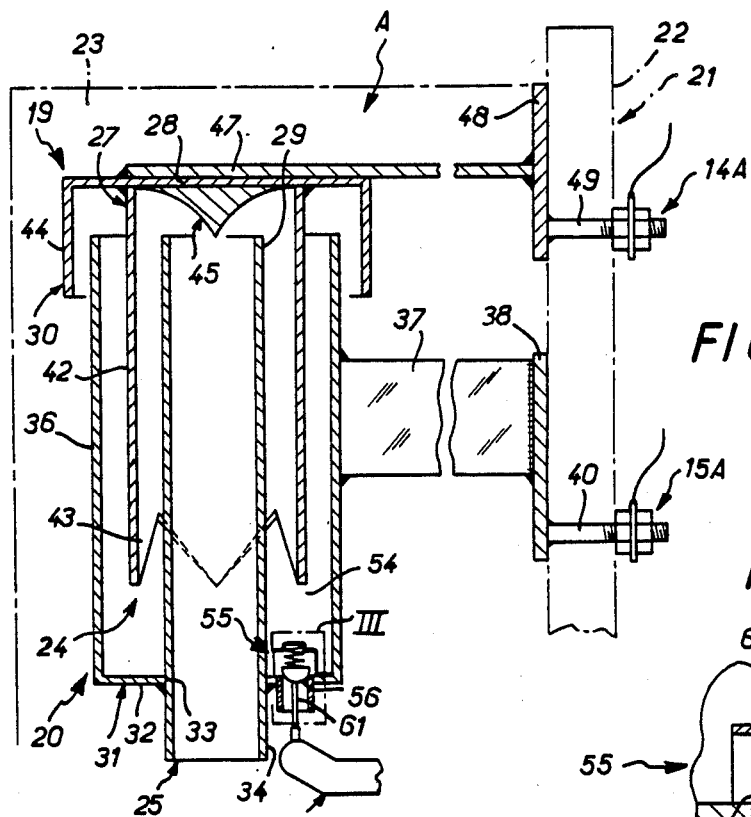
FIG. 2 is a view of it to a larger scale in partial transverse cross-section on the line II—II in FIG. 1.

In order to support the assembly it is fastened, as by welding, for example, to two arms 37 which are disposed parallel to one another and are themselves fastened, as by welding, for example, to a flange 38 which, for the purpose of fixing the assembly to a longitudinal partition 22 of the superstructure 21, carries a plurality of projecting threaded studs 40 of which one forms the corresponding terminal 15A, as shown in FIG. 2.

The various component parts of the thus constituted inlet electrode 20 are of course of metal.

The same applies to the associated outlet electrode 19.

As indicated hereinabove, the blind tubular members 27 and 30 thereof have a common bottom 28.

For example, the tubular member 27 is simply formed by a section of tube attached to the bottom 28, as by welding, for example.

Be this as it may, in the embodiment shown the cylindrical side wall 42 which this section of tube constitutes is deeply engaged within the annular volume defined by the central tubular member 25 of the inlet electrode 20 and the cylindrical side wall 36 of the blind tubular member 31 thereof, being at substantially the same distance from this tubular member 25 and this cylindrical side wall 36.

In practice the free edge 43 of the blind tubular member 27, that is to say the edge of the cylindrical side wall 42 thereof opposite that through which it is attached to the associated bottom 28, is spaced from the bottom 32 of the tubular member 31 of the inlet electrode 20.

In the embodiment shown, this free edge 43 is serrated, according to a cut profile which is triangular, for example and as shown.

As previously, the bottom 28 of the tubular members 27 and 30 of the outlet electrode 19 is spaced from the free edge of the central tubular member 25 and the cylindrical side wall 36 of the blind tubular member 31 of the inlet electrode 20.

For preference, and as shown, a metal point 45 projects from the bottom 28, at the end of the central tubular member 25 of the inlet electrode 20 and along the axis thereof.

In practice this is a relatively massive point the base of which is substantially complementary to the inside contour of the cylindrical side wall 42 of the blind tubular member 27 of the outlet electrode 19 and the end of which is substantially level with the upper end 29 of the central tubular member 25 of the inlet electrode 20 with, between said base and said end, a side wall in the shape of a body of revolution with a curved generatrix and the concave side facing outwards.

Unlike the cylindrical side wall 42 of its blind tubular member 27, the cylindrical side wall 44 of the blind tubular member 30 of the outlet electrode 19 extends in the embodiment shown over only a relatively restricted portion of the height of the tubular members 25 and 31 of the inlet electrode 20.

However, it is situated at a transverse distance from the cylindrical side wall 36 of the blind tubular member 31 of this inlet electrode 20 substantially equal to that separating from the latter and from the central tubular member 25 of said inlet electrode 20 the cylindrical side wall 42 of the blind tubular member 27 with which it is associated.

By means of a boom member 47 fastened, as by welding, for example, to the outside surface of the bottom of its tubular members 27 and 30, the outlet electrode 19 thus constituted is attached to a flange 48 and, as previously, this carries a plurality of projecting threaded studs 49 for fixing the assembly to the longitudinal partition 22 concerned of the superstructure 21, one of these studs forming the corresponding terminal 14A.

It results from the foregoing that, by virtue of the nesting of their respective tubular members, the circulation space 24 which is formed between the two electrodes 19 and 20 of itself constitutes chicane means for the electrolyte 18, the electrolyte 18 being required to follow a zig-zag path within this circulation space 24, alternately in one axial direction and then in the opposite direction, by passing around the free edge of certain at least of the tubular members constituting said electrodes 19 and 20.

It also results from the foregoing that this circulation space 24 also of itself constitutes a retention volume 54 for the electrolyte 18.

More precisely, this retention volume is defined by the blind tubular member 31 of the inlet electrode 20, by virtue of confinement between this blind tubular member 31 and the central tubular member 25 which surrounds it.

Associated with this retention volume 54 are evacuation means adapted to meter its emptying in a controlled manner.

Figure 3:
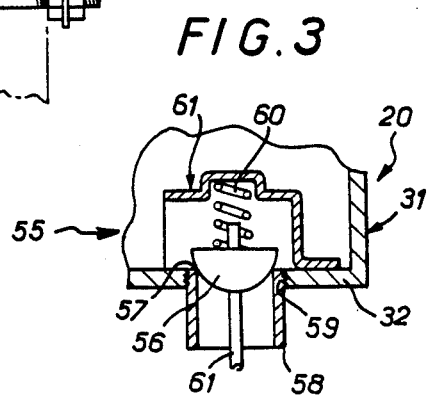
FIG. 3 shows to a still larger scale the detail of FIG. 2 shown by a box III thereon.

In the embodiment shown these evacuation means comprise a valve 55 which is disposed in the lower part of the retention volume 54 and the mobile valve member 56 of which is adapted to cooperate with a fixed valve seat 57 formed by the edge of a threaded tube 58 attached by screwing it into a threaded hole 59 formed to this end in the bottom 32 of the blind tubular member 31 of the inlet electrode 20 (FIG. 3).

The mobile valve member 45 is acted upon by control means.

These comprise, firstly, elastic return means, in this instance a coil spring 60 which bears on a boom member 61 attached by welding to the inside surface of the bottom 32 and continuously urges said mobile valve member 56 towards the closed position by acting on it in the direction in which it is able to be applied against the fixed valve seat 57 with which it is associated.

As said mobile valve member 56 is in practice carried by a rod 61 disposed substantially coaxially relative to the tube 58 forming its fixed valve seat 57, projecting downwardly out of said tube 58, the aforementioned control means further comprise a rocker arm 63 (FIG. 2) constrained to rotate with a control shaft 64 (FIG. 1).

Figure 5:
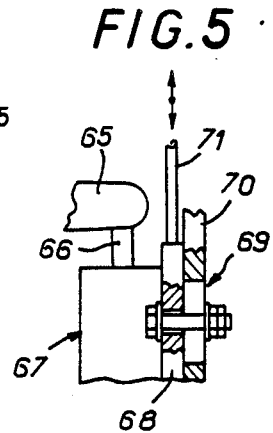
FIG. 5 is a partial end-on view of it in the direction of the arrow V in FIG. 1, locally cut away.

At one end this shaft 64 carries a rocker arm 65 on which the plunger 66 of a control solenoid 67 is adapted to operate (FIGS. 1 and 5).

This solenoid 67 is carried by a baseplate 68 which is mobile vertically on a support flange 70, by means of a slot 69 as shown in FIG. 5, the support flange 70 being itself fixed to the longitudinal partition 22 of the superstructure 21 in a manner not shown in the figures.

The position of the solenoid 67 is controlled by a control rod 71 which is coupled to the baseplate 68 which carries it and is accessible to the user, being lockable in position by virtue of arrangements which, lying within the competence of those skilled in the art, will not be described in detail here.

The shaft 64 extends parallel to the longitudinal partitions of the superstructure 21 and is rotatably mounted in the transverse partitions 23 thereof. It is common to all phases A, B and C, said shaft 64 carrying the spaced rocker arms 63, one for each of phases A, B and C.

In the embodiment shown the electrodes 19 and 20 of the various phases A, B and C share the same electrolyte tank 17.

They also share pulsing means adapted to circulate the electrolyte 18 within their circulation space 24.

In the embodiment shown these pulsing means consist of a pump 72 with its intake 73 immersed in the electrolyte tank 17 driven in rotation by a motor 74 outside the tank.

A distributor 75 is preferably disposed, as shown here, between the electrodes 19 and 20 for the phases A, B and C and this pump 72.

In the embodiment specifically shown in FIG. 1, this distributor 75 is in the form of a cylinder extending substantially horizontally in the electrolyte tank 17, its ends being closed.

The interior volume of this cylinder is divided into a lower compartment 78 and an upper compartment 79 by a partition 76 which extends in a substantially horizontal diametral plane and in which are formed openings 77.

By means of a tube 80 situated in its lower part, substantially in its median area, and a flexible hose 82 the lower compartment 78 is connected to the outlet of the pump 72.

By means of tubes 84 spaced along its upper part, in line with which the plate 76 does not comprise any openings 77, and insulative material sleeves 85, the upper compartment 79 is connected to the central tubular member 25 of the inlet electrode 20 of the various phases A, B and C by sleeving a sleeve 85 of this kind over the connecting tube formed for this purpose by the lower end 34 of a central tubular member 25 of this kind.

Figure 7:
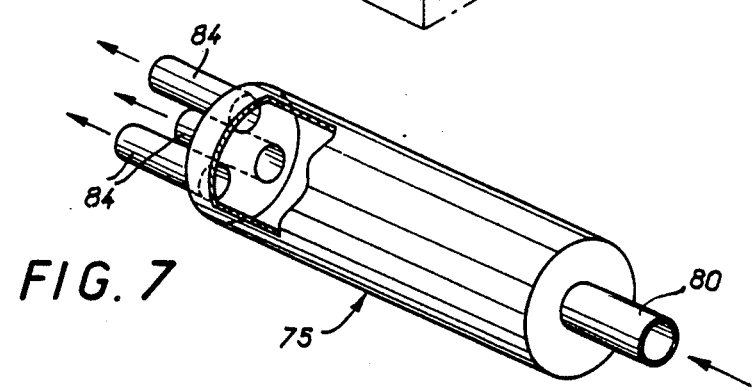
FIG. 7 is a perspective view, partially corresponding to that of FIG. 1 and concerning an alternative embodiment.

In the embodiment shown in FIG. 7, the cylinder constituting the distributor 75 is hollow, its inlet sleeve 80 being simply located in the central area of one of its ends, whereas its outlet sleeves 84 are circumferentially distributed around its axis, at the other end.

Finally, with the electrodes 19 and 20 for each of the phases A, B and C there is associated a mobile contact 86 adapted to connect them electrically to one another to take them out of service.

Figure 4:
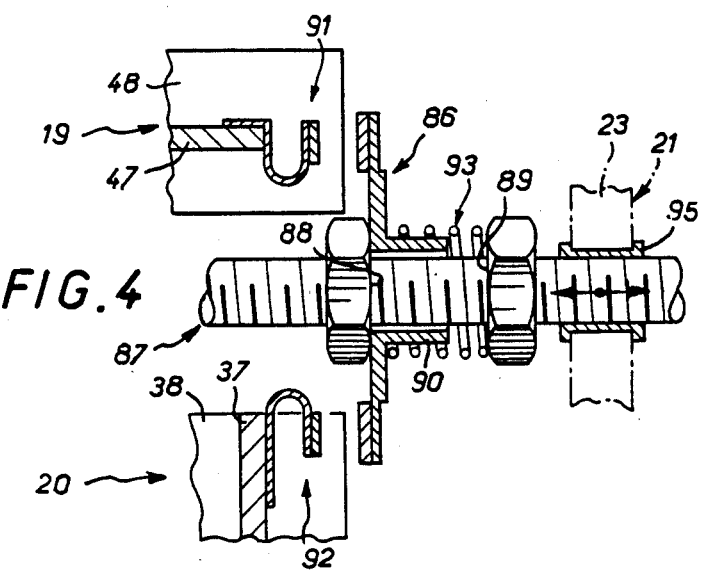
FIG. 4 is another partial view of the liquid resistance rheostat in accordance with invention in cross-section of the line IV—IV in FIG. 1 and to a different scale.

In the embodiment shown, and as is more clearly seen for one of them in FIG. 4, each of the mobile contacts 86 that the liquid resistance rheostat 16 in accordance with the invention thus comprises is slidably mounted on a control rod 87 between two shoulders 88 and 89 thereon and is adapted to cooperate with fixed contacts 91 and 92 respectively carried by the boom member 47 of the outlet electrode 19 for the phase A, B or C concerned and one of the support arms 37 for the corresponding inlet electrode 20.

More precisely, in this embodiment the control rod 87 is a threaded rod on which is slidably mounted for each of phases A, B and C a respective bush 90 carrying the mobile contact 86 concerned, and the shoulders 88 and 89 are formed on two nuts threaded onto it.

A locknut may of course be associated with each of these nuts, for locking it in position.

By virtue of elastic bearing means, in this instance a coil spring 93 which bears on the nut forming the shoulder 89 of the control rod 87, each mobile contact 86 is continuously urged in the direction towards the other shoulder 88, that is to say the shoulder on said control rod 87 nearer the fixed contacts 91 and 92.

As will be readily understood, the nut forming the shoulder 88 limits the travel of the mobile contact 86 and that forming the shoulder 89 enables the compression of the spring 93 to be adjusted.

The control rod 87 extends longitudinally, parallel to the longitudinal partitions 22 of the superstructure 21, passing through the transverse partitions 23 thereof sliding fashion, by means of bushes 95 attached for this purpose to these transverse partitions 23. It is common to all the phases A, B and C, this control rod 87 carrying spaced contacts 86, one for each of said phases A, B and C, by virtue of arrangements described hereinabove.

Thus as is seen in FIG. 1, the control rod 87 is acted on by reciprocating control means 96 through the intermediary of a bell crank 97, said reciprocating control means 96 extending generally transversely relative to its axis.

In other words, these reciprocating control means 96, which are in practice disposed outside the superstructure 21, extend parallel to one of the end transverse partitions 23 thereof, being supported by this transverse partition 23 and therefore occupying minimum space.

These reciprocating control means 96 comprise a pantograph 98, or articulated parallelogram, of which one apex, the apex 100, is fixed whereas the opposite apex, the apex 101, is formed by an egg insulator shaped member to which is pivoted at its elbow the bell crank 97.

One branch of this bell crank 97 is coupled to the control rod 87 for the mobile contacts 86 and the other branch is pivoted to a fixed yoke 102.

A spring 103 stretched between the apexes 100 and 101 of the pantograph 108 urges the apex 101 to which the bell crank 97 is pivoted continuously towards the fixed apex 100, whereas the other apexes 104 and 105 of this pantograph 98 are each subject to the action of a control solenoid 106, 107 adapted to synchronously move them towards one another, against the action of said spring 103.

Figure 6A:
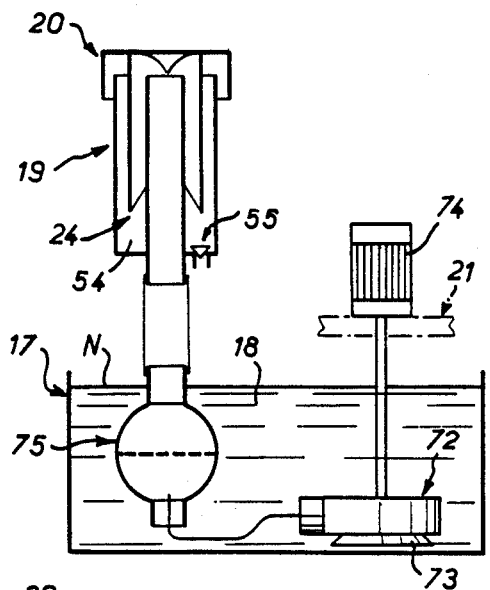
FIGS. 6A, 6B, 6C and 6D are views in transverse cross-section which, like that of FIG. 2, illustrate various phases in the utilization of the liquid resistance rheostat in accordance with the invention.

When the liquid resistance rheostat 16 in accordance with the invention is inoperative, the electrodes 19 and 20 of each of its phases A, B and C are spaced from the electrolyte 18 contained in the electrolyte tank 17, as schematically represented in FIG. 6A for one of these phases A, B and C.

The valve 55 controlling the retention volume 54 formed between the electrodes 19 and 20 is conjointly in the closed position.

The solenoids 106 and 107 controlling the pantograph 98 are then de-energized so that the spring 103 maintains the pantograph in a retracted position in which, via the bell crank 97, the control rod 87 itself then in a retracted position holds each mobile contact 86 by means of its corresponding shoulder 88 away from the fixed contacts 91 and 92 with which a mobile contact 86 of this kind is associated.

Figure 6B:
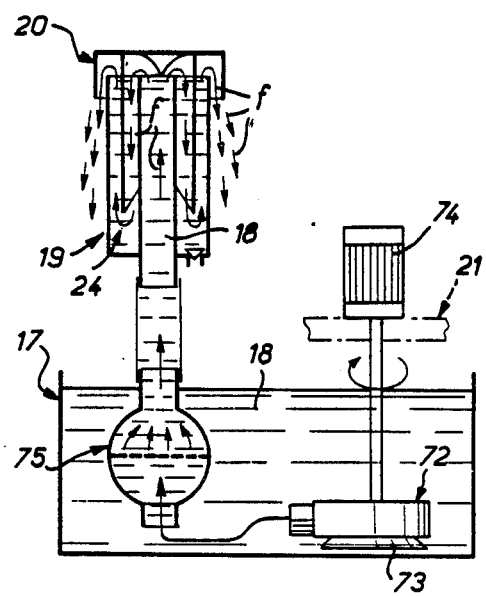

To start the motor 11, the motor 74 is started up (FIG. 6B).

As a result of this, through the intermediary of the distributor 75, the pump 72 directs a flow of the electrolyte 18 to the circulation space or electrolyte flow path means 24 formed between the electrodes 19 and 20.

As described hereinabove, before returning under gravity into the electrolyte tank 17 this flow of the electrolyte 18 travels in a zig-zag path through the circulation space 24, as shown by the arrows f in FIG. 6B.

The invasion of the circulation space 24 by the electrolyte 18 is of course progressive, which procures the required progressive starting up of the motor 11, subject to control, for example, by the flowrate of the pump 72 and, possibly, an evacuation flowrate established by the valve 55, the opening of which is appropriately controled.

As will be noted, the flow of the electrolyte 18 entering through the central tubular member 25 of the inlet electrode 20, the initial passage of current between this inlet electrode 20 and the outlet electrode 19 is effected through the intermediary of the point 45, which advantageously protects the relevant parts of said electrodes 19 and 20.

Figure 6C:
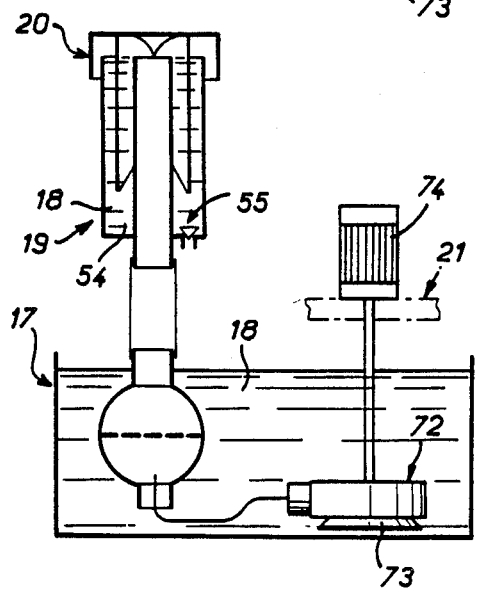

When the starting up of the motor 11 has been completed, the motor 74 is stopped (FIG. 6C).

The retention volume 54 formed between the electrodes 19 and 20 of each of the phases A, B and C then remains momentarily full of the electrolytes 18 if, as shown, the valve 55 is left in the closed position.

By virtue of energization of the solenoids 106 and 107, the pantograph 98 moves to the deployed position and the mobile contacts 86 are then held against the associated fixed contacts 91 and 92, which takes the electrodes 19 and 20 out of service.

The corresponding power consumption of the solenoids 106 and 107 is in practice low, the relevant deployed position of the pantograph 98 being close to its equilibrium position.

Be this as it may, the closure of the mobile contacts 86 advantageously entails no inrush of current because of the volume of electrolyte 18 contained in the retention volume 54 that the electrodes form.

Figure 6D:
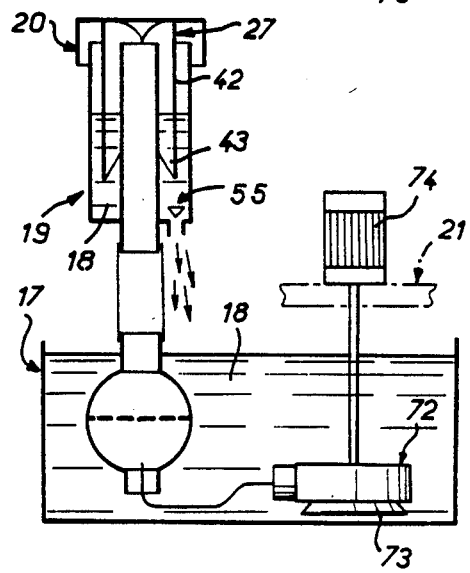

As schematically represented in FIG. 6D, the emptying of this retention volume 54 is then brought about by opening the valve 55.

As will be easily understood, this emptying may also be brought about on stopping the motor 11 in order to achieve controlled deceleration of the motor.

In all cases, it is possible to adjust to any required value the corresponding emptying outflow rate, by adjusting the height of the baseplate 68 carrying the solenoid 87 controlled the valve 55.

At the end of such emptying the serrated edge 43 of the cylindrical side wall 42 of the tubular member 27 of the outlet electrode 19, through which the current between this outlet electrode 19 and the inlet electrode 20 ultimately flows, procures by virtue of its serrations a progressive interruption of the passage of current, which advantageously eliminates any risk of arcing.

Figure 8:
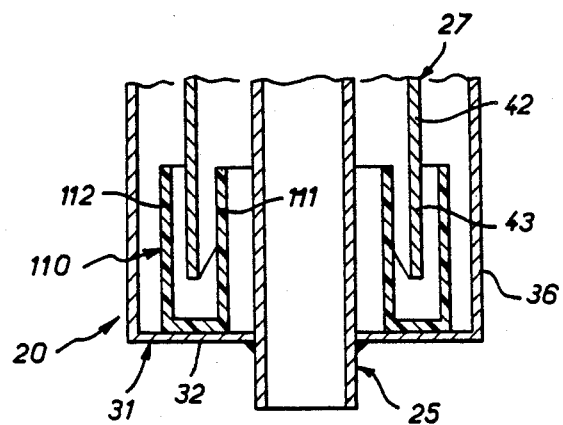
FIG. 8 is a partial view in transverse cross-section, analogous to that of FIG. 2 and concerning another embodiment.

In the alternative embodiment shown in FIG. 8, there is provided to the same end, projecting from the bottom 32 of the tubular member 31 of the inlet electrode 20, an insulative material annular cup member 110 which features two coaxial annular walls 111 and 112 each inserted between two consecutive tubular members of the electrodes 19 and 20, namely, for the first of them, the central tubular member 25 of the inlet electrode 20 and the cylindrical side wall 42 of the blind tubular member 27 of the outlet electrode 19 and, in the case of the second of them, this cylindrical side wall 42 and the cylindrical side wall 36 of the blind tubular member 31 of the inlet electrode 20.

On completing the emptying of the retention volume 54 which is formed between the electrodes 19 and 20, this annular cup member 110 advantageously procures a sudden increase in resistance so that the current passing from one of these electrodes to the other falls off sharply, without any risk of arcing between them.

The annular cup member 110 used for this purpose has no effect on powering up, the current between the electrodes 19 and 20 being established at the opposite end of the central tubular member 25 of the inlet electrode 20, as described hereinabove.

Figure 9:
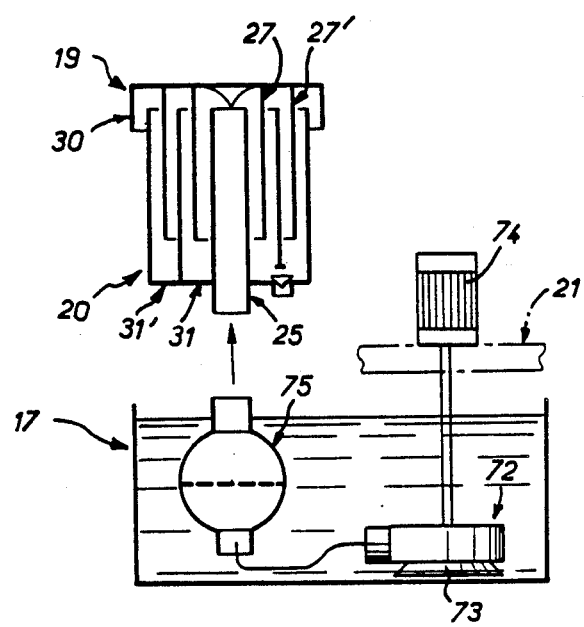
FIG. 9 is a view analogous to those of FIG. 6 and also concerning another embodiment.

In the alternative embodiment shown in FIG. 9, the inlet electrode 20 comprises, in addition to its central tubular member 25, in successive rings around this, two blind tubular members 31 and 31', and the outlet electrode 19 comprises, in rings, and alternating with the former members, three blind tubular members 27, 27' and 30, this increasing the extent of the baffle means formed in this way between the electrodes 19 and 20.

It is to be understood that either or both of the electrodes may comprise any number of tubular members.

Figure 10:
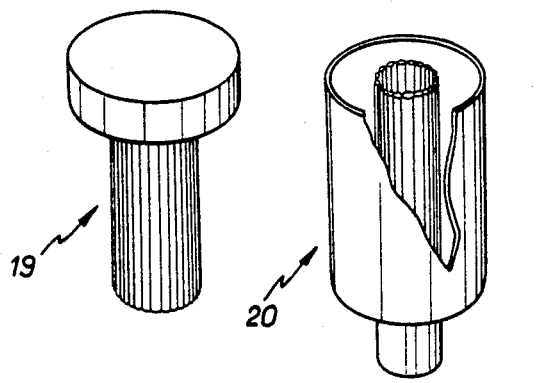
FIGS. 10 and 11 are perspective views showing two embodiments of the electrodes employed in the liquid resistance rheostat in accordance with the invention.

The electrodes 19 and 20, or at least one of them, may also be formed at least in part by a longitudinal assembly of wires or tubes which, given the rounded transverse cross-section of such wires or tubes, results in an advantageous increase in their exchange surface area; this possibility is shown in FIG. 10.

Figure 11:
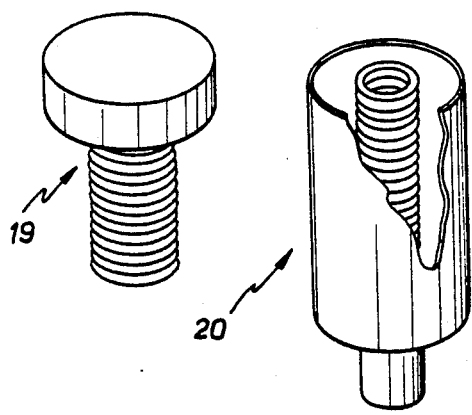

They may also be formed by rolling such wires or tubes; this possibility is shown in FIG. 11.

In both cases, where tubes are used, these may advantageously be employed to circulate a coolant.

In another embodiment, the electrodes 19 and 20, or at least one of them, may consist at least in part of expanded metal, to the obvious exclusion of their outer jacket.

Two functions are then advantageously associated with one another: on the one hand, the exchange surface area is increased, which for a given current enables the electrodes to be moved farther away from one another and thus the voltage to be increased, the critical voltage threshold for arcing being moved back; on the other hand, the electrolyte is offered two circulation paths, one between the electrodes as previously and the other through the walls of the electrodes, which advantageously favors the degasing of the electrolyte, that is to say the entrainment of the microbubbles which form where it contacts said electrodes.

In another embodiment the electrodes 19 and 20, or at least one of them, are molded or die-stamped.

It also possible to dispose between them, over their full height, two insulative material walls forming a screen, one of which is fixed and the other of which is mobile and adjustable in position, these walls having openings in them which can be superposed on one another: when these openings are lined up conduction occurs, whereas when they are offset the arrangement is an insulative one; in this way it is advantageously possible to adjust the capacity for exchange between the electrodes, independently of the bath.

The mobile contacts 86 are also preferably demountable.

Their control rod being sectioned for this purpose, each of them may be removably carried by a frame-shaped yoke, for example, replacing the nuts forming the corresponding shoulders on the control rod and joining two adjacent sections thereof, a mobile contact being then engaged within a yoke of this kind, being guided by its edges.

Figure 12:
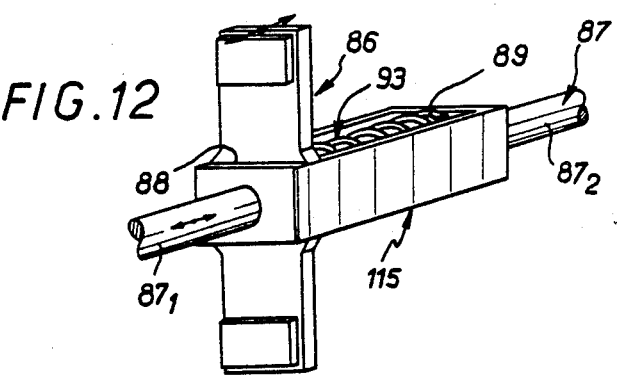
FIG. 12 is a perspective view showing one embodiment of the control mechanism associated with the contacts also employed in this rheostat.

This possibility is shown in FIG. 12, in which is seen the frame-shaped yoke 115 connecting two sections $87_1$ and $87_2$ of the control rod 87, itself forming the shoulders 88 and 89 of the latter.

The mobile contact 86 is secured to the edges of this yoke 115 by lateral barbs 116; to demount it is sufficient to pivot it and then to release it upwardly or downwardly.

Figure 13:
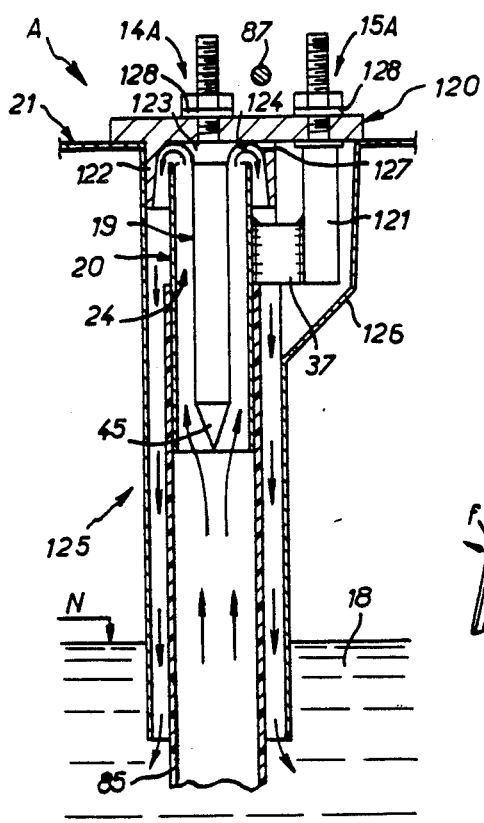
FIG. 13 is a view in transverse cross-section analogous to that of FIG. 2 for another embodiment of the electrodes employed in the liquid resistance rheostat in accordance with the invention.

In the embodiment shown in FIG. 13, the outlet electrode 19 for each phase is a simple rod, preferably terminated by a point 45, as shown here, and the associated inlet electrode 20 is a simple tube disposed annularly around said rod, at a distance therefrom.

The outlet electrode 19 is directly supported by a plate 120 resting on the superstructure 21, in the upper part thereof.

It is suspended from this plate 120 and the associated terminal 14A simply forms a threaded extension of it which passes through the plate.

The inlet electrode 20 is also carried by the plate 120, said inlet electrode 20 being connected by an arm 37 to a rod 121 which, like that forming the outlet electrode 19, to which it is parallel, is suspended from said plate 120, a threaded extension of it passing through the plate to form the corresponding terminal 15B.

Around the inlet electrode 20, the plate 120 features, projecting from its lower surface, a tubular extension 122 which forms internally, around the outlet electrode 19, together with a ring 123 forming the foot of the latter, a rounded toroidal surface 124 extending around the corresponding edge of said inlet electrode 20.

In this embodiment the superstructure 121 itself comprises, around the tubular extension 122 previously mentioned, a guide chimney 125 of insulative material in which is nested said tubular extension 122 and which, coaxial with the electrodes 19 and 20, dips into the electrolyte 18 contained in the underlying tank 17.

On its side this guide chimney 125 comprises a boss 126 for the arm 37 carrying the inlet electrode 20 to pass through and for mounting the corresponding rod 121.

In line with this boss 126 the tubular extension 122 preferably, and as shown here, comprises at least one vent 127 passing right through it.

The point 45 of the outlet electrode 19 is substantially level with the corresponding edge of the inlet electrode 20 and an insulative material sleeve 85 is engaged over this electrode in order to connect it to the associated operational pumping means, which are of the same type as previously described.

Figure 14:
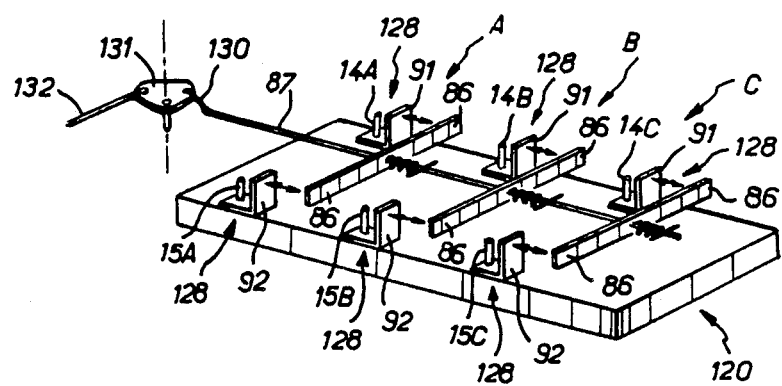
FIG. 14 is a schematic view in perspective of another embodiment of the control mechanism for the corresponding contacts.

In this embodiment, in addition to the electrodes 19 and 20 and the terminals 14 and 15 for each of the phases A, B and C, the plate 120 also carries the mobile contacts 86 and the corresponding fixed contacts 91 and 92, as schematically represented in FIG. 14.

These fixed contacts 91 and 92 are electrically connected directly to the terminals 14 and 15 concerned, each of said fixed contacts 91 and 92 being carried by one of the branches of an angle bracket 128 the other of which, applied to the plate 120, has the threaded extension forming the corresponding terminal 14, 15 passing through it; the mobile contacts 86 are acted on by a control rod 87, by virtue of arrangements similar to those previously described.

At its end the control rod 87 is coupled by a link 130 to a bell crank 131 which is mounted to pivot about an axis parallel to the electrodes 19 and 20 and to which is coupled the plunger 132 of a control solenoid (not shown) the axis of which thus extends transversally relative to the axis of the control rod 87.

Thus in this embodiment, instead of being disposed to the side in the same enclosure as the electrodes, the assembly formed by the various contacts and their control mechanism is advantageously disposed in the upper part of the superstructure 21, above the plate carrying said electrodes; in this way the accessibility of this assembly and its isolation from the electrolyte 18 are improved.

Also, a single solenoid is then sufficient for controling the mobile contacts and an appropriate configuration of the bell crank 131 and an appropriate disposition of its rotation axis and the points to which the link 130 and the plunger 132 are pivoted to it ensure that, when it is engaged, that is to say when the springs associated with these mobile contacts are at the maximum stress, the resisting force on said plunger is minimal, or even null, which enables the size of the control solenoid employed and the critical release voltage due to possible accidental voltage drops to be minimized.

In service, and as schematically represented by arrows in FIG. 13, the electrolyte 18 flows in one direction only, in practice the upwards direction, between the electrodes 19 and 20 in the circulation space 24 defined between these, before returning under gravity into the underlying tank, being appropriately confined by the guide chimney 125.

As will be understood, by virtue of the fact that it dips into the electrolyte 18 in the underlying tank, this guide chimney 125 correspondingly increases the electrical path between the live parts.

Furthermore, the draining of the electrolyte 18 is improved, only the arm 37 lying on its path, and the vent or vents 127 preventing any accumulation of gas in the tubular extensions 122 of the plate 120.

In practice, this embodiment is especially suited to low-power apparatus for which minimum overall dimensions is a requirement.

It is to be understood that the invention is in no way limited to the case where, as specifically described hereinabove, the electrodes employed are annular or cylindrical.

On the contrary, it also encompasses the case where they are simple plates parallel to one another.

Figure 15:
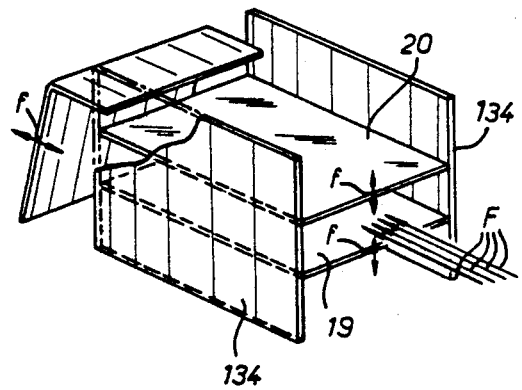
FIG. 15 is a partially cut away schematic view in perspective of another embodiment of the electrodes.

This possibility is shown schematically in FIG. 15.

As schematically represented by the double-headed arrows f, two parallel metal plates of which one forms the inlet electrode 20 and the other forms the outlet electrode 19 are mounted to move parallel to themselves between insulative material flanges 134.

In this case, and as schematically represented by the arrows F, the electrolyte employed is projected between these plates, for example by a tube the shape of which reflects the volume delimited between the plates and the flanges 134, and it is then possible to adjust the current by adjusting the distance between the plates, in addition to or instead of the adjustment which involves controlling the electrolyte conductivity.

At the rear is a deflector 135 which is adjustable in position and charges the volume delimited between the electrodes and the flanges 134 with the electrolyte by impeding the outflow of electrolyte from this space.

The present invention is not limited to the embodiments described and shown, but encompasses any variant execution, especially in regard to the means controlling the valve which controls the retention volume formed between the electrodes for the same phase, and in regard to the means for adjusting these control means when a retention volume of this kind is provided.

In no circumstances is the in-line arrangement of the electrodes imperative. They may also be disposed in a triangle, for example.

Also, to obtain the required circulation of the electrolyte operational pumping means other than those consisting of a simple pump may be employed, and/or individual operational pumping means may be provided for each phase.

Although when, as described, sleeves are employed to form a connection between such pulsing means and the circulation space formed by the electrodes of the same phase it is important that these sleeves are of insulative material, such sleeves are not actually indispensible.

It may suffice to fill a circulation space of this kind by means of a simple jet of electrolyte appropriately directed along the axis of the central tubular member which provides access to it.

This is the reason why no such sleeve is shown in FIG. 9.

In this case there is a real gap between the electrodes and the associated pulsing means, it being understood that when a sleeve is employed, this sleeve of itself constitutes an insulating gap between such electrodes and such operational pumping means, whilst advantageously opposing penetration of air into the flow of electrolyte which it channels.

In all cases, this flow of electrolyte may enter the circulation space provided for it between two electrodes from the top or from the bottom, and its direction on entering this circulation space is not necessarily vertical, the electrodes not necessarily extending vertically, for example, although an orientation of this kind is more favorable to simple emptying by gravity of the retention volume that may be formed between them.

Instead of being disposed in the same enclosure as the electrodes, as shown, the contacts employed may advantageously be disposed outside the enclosure, which makes them more accessible and protects them from moisture.

Finally, in order to construct an explosion-proof rheostat, the electrodes may be surrounded by a neutral gas or a dielectric liquid such as silicone which is not miscible in water, instead of the ambient air, in which case the enclosure in which they are contained is appropriately rendered fluid-tight.

It is to be understood that when a liquid is used, during inoperative periods this liquid will invade the retention volume which is formed between the electrodes where a retention volume of this kind is provided, but that it is temporarily expelled therefrom by the electrolyte during operation, before returning to it under gravity, for example.

I claim:

1. Liquid resistance rheostat comprising a tank containing electrolyte, a pair of spaced electrodes, one of said electrodes having means to be connected to an electrical power supply and the other of said electrodes having means to be connected to an apparatus to be supplied with electric power, electrolyte flow path means defining an electrolyte flow path and including an inlet for communicating with the electrolyte in said tank and an outlet, said electrodes being arranged in said electrolyte flow path means, the rheostat having a rest condition in which said electrodes are out of contact with the electrolyte, operational pumping means for pumping the electrolyte from said tank through said electrolyte flow path means at a predetermined high flow rate for bringing the electrolyte into contact with said electrodes and thereby the rheostat into its operative condition.

2. Liquid resistance rheostat according to claim 1, wherein said electrodes define therebetween at least a portion of said electrolyte flow path means.

3. Liquid resistance rheostat according to claim 1, wherein said electrodes are arranged in a portion of said electrolyte flow path means, said portion of said electrolyte flow path means defining a retention volume for retaining electrolyte after said pumping means has stopped, and further comprising retention volume evacuating means for discharging the electrolyte from said retention volume at a predetermined discharge flow rate.

4. Liquid resistance rheostat according to claim 1, wherein said electrodes are both generally annular and substantially coaxial relative to each other.

5. Liquid resistant rheostat according to claim 1, wherein one of said electrodes comprises a central tubular member open at both ends arranged proximate to said inlet of said electrolyte flow path means and the other of said electrodes comprising at least one blind tubular member having a blind end and an open end received with clearance over said central tubular member and arranged proximate to said outlet of said electrolyte flow path means.

6. Liquid resistance rheostat according to claim 5, wherein axes of said electrodes are arranged substantially vertically, said blind tubular member having its lower end proximate to an upper end of said central tubular member.

7. Liquid resistant rheostat according to claim 5, wherein said central tubular member has an axis, a point projects from a lower end of said blind tubular member proximate to an upper end of said central tubular member, and along the axis of said central tubular member.

8. Liquid resistance rheostat according to claim 5, wherein said blind tubular member has an open end and a serrated edge at said open end.

9. Liquid resistance rheostat according to claim 5, wherein said other electrode comprises two blind tubular members arranged in succession and said one electrode comprises, around said central tubular member, at least one additional blind tubular member disposed between said two blind tubular members.

10. Liquid resistance rheostat according to claim 3, wherein said other electrode comprises two blind tubular members arranged in succession and said one electrode comprises, around said central tubular member, at least one additional blind tubular member disposed between said two blind tubular members, said retention volume being defined by said blind tubular member of said one electrode.

11. Liquid resistance rheostat according to claim 3, wherein said evacuation means comprises a valve arranged in a lower part of said retention volume, said valve having a mobile valve member connected to control means.

12. Liquid resistance rheostat according to claim 9, wherein an insulative material annular cup projects from a lower end of said blind tubular member of said one electrode and comprises coaxial annular partitions interposed between said two consecutive blind tubular members of said electrodes.

13. Liquid resistant rheostat according to claim 1, wherein one of said electrodes comprises a rod with a pointed end and the other of said electrodes comprises a tube disposed annularly around said rod.

14. Liquid resistance rheostat according to claim 13, wherein said electrolyte flow path means further comprises an insulative material guide duct having one end immersed in said electrolyte in said tank.

15. Liquid resistance rheostat according to claim 1, wherein said electrodes are connected to each other via switch means, said switch means being operable to short-circuit said electrodes to render the rheostat inoperative.

16. Liquid resistance rheostat according to claim 15, wherein said switch means comprises a mobile contact slidably mounted on a control rod having an axis, said control rod being reciprocably mounted for movement along said control rod axis, elastic means constantly urging said mobile contact towards a shoulder on said control rod.

17. Liquid resistance rheostat according to claim 16, further comprising reciprocating control means extending generally transversely to the axis of said control rod for controlling said control rod.

18. Liquid resistance rheostat according to claim 1, wherein there is a plurality of said pairs of said electrodes, each of said pairs of electrodes being common to said electrolyte tank.

19. Liquid resistance rheostat according to claim 18, wherein said operational pumping means are common to said plurality of pairs of electrodes, and means for distributing electrolyte being disposed between said operational pumping means and respective said electrolyte flow path means for said pairs of electrodes.

20. Liquid resistance rheostat according to claim 1, wherein there is an insulating gap between said electrodes and said operational pumping means.

21. Liquid resistance rheostat according to claim 2, wherein said electrodes are tubular and define said inlet and outlet of said electrolyte flow path means.

22. Liquid resistance rheostat according to claim 21, wherein said electrodes also define a baffle means for reversing the direction of the flow of electrolyte between said electrodes.

23. Liquid resistance rheostat according to claim 2, wherein said portion of said electrolyte flow path means is adapted to fill with electrolyte as said operational pumping means comes into service.

24. Liquid resistance rheostat according to claim 1, wherein in the operative condition of the rheostat the level of electrolyte in said electrolyte flow path means remains constant once the electrolyte reaches said outlet thus defining current limiting means.

25. Liquid resistance rheostat according to claim 1, wherein the apparatus to be supplied is a squirrel-cage motor.

26. Liquid resistance rheostat according to claim 21, wherein said one electrode defines said inlet and said one electrode and said other electrode together define said outlet.

* * * * *